US006169599B1

(12) United States Patent
Fuersich et al.

(10) Patent No.: US 6,169,599 B1
(45) Date of Patent: Jan. 2, 2001

(54) METHOD FOR DETERMINING THE AMOUNT OF LIGHT IN EACH PRIMARY COLOR WHEN COPYING A COLORED ORIGINAL

(75) Inventors: Manfred Fuersich, Taufkirchen; Helmut Treiber; Wolfgang Zahn, both of Munich, all of (DE)

(73) Assignee: Agfa-Gevaert Aktiengesellschaft, Leverkusen (DE)

( * ) Notice: Under 35 U.S.C. 154(b), the term of this patent shall be extended for 0 days.

(21) Appl. No.: 08/115,209

(22) Filed: Sep. 1, 1993

(30) Foreign Application Priority Data

Sep. 15, 1992 (DE) ............................................. P 42 30 841

(51) Int. Cl.[7] ............................ G03B 27/80; G03B 27/32
(52) U.S. Cl. .................................................. 355/77; 355/38
(58) Field of Search .................................. 355/38, 68, 77

(56) References Cited

U.S. PATENT DOCUMENTS

| 4,279,502 | * | 7/1981 | Thurm et al. | 355/38 |
| 4,561,768 | * | 12/1985 | Fürsich et al. | 355/38 |
| 4,566,786 | * | 1/1986 | Fürsich et al. | 355/77 |
| 5,148,213 | * | 9/1992 | Terashita | 355/38 |
| 5,555,073 | * | 9/1996 | Gossman et al. | 355/41 |
| 5,561,494 | * | 10/1996 | Terashita | 355/38 |

* cited by examiner

*Primary Examiner*—Russell Adams
*Assistant Examiner*—Christopher Mahoney
(74) *Attorney, Agent, or Firm*—Darby & Darby

(57) ABSTRACT

There is disclosed a method for determining the amounts of individual copying light when copying color originals, particularly color negatives which are combined into films. The color originals are scanned photoelectrically and separately in the primary colors by region or by point, and the results of the measurement are used to control the amounts of copying light. For each scanned region a first difference is formed between the density values of two basic colors, a second difference is formed between the density values of one of these basic colors and the third basic color, and the average density is formed from the density measurements of the three basic colors. In each case, a functional relationship with the average density is produced, known as a color density difference curve, which describes the color behavior of the recording material on which the copy is to be made. This functional relationship supplies film-specific values for producing copies of the film, the film-specific values being used for the determination of the amounts of copying light for the original to be copied. For films of one type, the functional relationship between color density difference values and average densities describing the color behavior common to this are determined and stored as standard color density difference curves. When a film of this type appears, these stored standard color density difference curves are used to determine copying light quantities.

3 Claims, 2 Drawing Sheets

METHOD FOR DETERMINING THE AMOUNT OF LIGHT IN EACH PRIMARY COLOR WHEN COPYING A COLORED ORIGINAL

BACKGROUND OF THE INVENTION

The invention relates to a method for determining the individual amounts of light for each primary color in a color copying process.

In a known method of determining the amount of light in each primary color to which a colored original (i.e., a negative or transparent positive such as a slide) is to be exposed during copying, each of a series of regions or points of the original is scanned in the three primary colors, e.g. to measure the transparency of the original to light of each color. The measurements obtained from each region are compared with reference values in order to determine whether the respective regions contain color dominants. The amount of light in each primary color to which the original is to be exposed during copying is then calculated disregarding the regions with color dominants altogether or giving less weight to such regions.

U.S. Pat. No. 4,279,502 of Thurm et al. describes how to determine color density difference curves for a film from the color density values and average densities of individual color originals, e,g. color negatives. The regions of the original are checked first to see which are relatively neutral in color and which belong to a dominant color region. Also, the regions are analyzed to see whether there was atypical photographic illumination, which would also result in a clear color shift. Image containing regions with a photographic object of a dominant color or with a color tinge due to the illumination cannot be used for the formation of color density difference curves.

Techniques for reliably identifying color-dominant regions are described in U.S. Pat. No. 4,561,768 of Fursich et al. The method employed in the '768 patent searches for the thinnest or most transparent regions on the film. Locating an impermissibly large color deviation from a neutral value is made by comparison with the mask value on the assumption that the thinnest point also at the same time represents the mask value. It is also possible to start from absolute values, determined for example from an average of the mask values of a large number of films. Finally, a color difference curve, obtained from a first passage of the measured values through a computer, can itself serve as a comparison scale for a second, improved passage.

The foregoing methods provide good values for certain negatives and values that are not as good for other negatives. Since the nature of the negatives is difficult to classify, the identification of dominant colors is difficult, particularly in films, the negatives of which reproduce the same color-dominant motif in large numbers. Moreover, the identification of dominants is difficult in very short films, particularly in individual negatives, if there is no probability of a statistical equalization of the motifs over the whole of the film. In the case of professional films, which are used as portrait films in a studio under constant conditions of illumination and for which the requirements of color fidelity are particularly high, a sufficiently accurate recognition of dominants is difficult.

OBJECT OF THE INVENTION

It is an object of the invention to provide an improved method for identifying dominants and color tinges in a color copying system of the type disclosed in U.S. Pat. Nos. 4,297,502 and 4,561,768.

SUMMARY OF THE INVENTION

Standard color density difference curves provide a reliable indication of whether the scanned regions of the color original are suitable for establishing a color density difference curve specific to the film containing the original. According to one embodiment of the invention, the color density difference values for a particular film type are stored in memory and the required value determined by optically reading a DX code, for example, on one edge of the film. Alternatively, the film type identification can be entered manually and the color density difference curves taken from memory to calculate the copying light amounts.

The standard color density difference data for each film type can be obtained in various ways. For example, gray fields or gray steps can be exposed on test films. These films may be subsequently developed and measured. From the point of view of exposure, this technique provides reliable measurement values. However, the method does not take into consideration the fact that the properties of photographic films of one type fluctuate to some extent. Very accurate information concerning the standard curves would therefore be possible only on the basis of a large number of test films. However, the cost when a large number of film types is used is not justifiable.

According to a further feature of the invention, the standard color density difference curves for a film type are formed by averaging color density difference curves obtained from a large number of films of one type. Such averaging is based on actual experience and also takes into consideration certain trends in the properties of photographic film types and the film development in the laboratory, particularly, if over longer periods of time the older measured values are no longer taken into consideration or if less weight is attached to such values. One method of discounting the effect of older data is to assign backwards directed ordinal numbers to each new set of data.

Furthermore, the standard color density difference curves can be used as a color standard for identifying special color surfaces in the originals, such as skin shades or white textiles. The correct reproduction of the colors of such characteristic surfaces is, to a high degree, an indication of the quality or correctness of a copy, so that various methods are directed particularly to the correct reproduction of such surface areas. However, such special colored surfaces can be identified correctly only if it is possible to accurately define the colored space in which they are located. Such a definition requires a standard, for which the film type-specific standard color density difference curves are particularly well suited. The film typespecific standard color density difference curves can be used as a gray standard for locating such specially colored surfaces.

According to a further feature of the invention, the standard color density difference curves can also be averaged with color density difference curves determined for the color film on the basis of its image containing regions and the image values can be specified for calculating the copying light quantities. These film-specific values are less susceptible to the accumulation of particular motifs within a film and are good for equalizing color tinges of the films, which can arise due to lengthy storage, wrong development, etc. Finally, the standard color density difference curves are helpful for color originals in which the film-specific values can be based only on a very small number of values that are not dominant, particularly in the case of copying individual negatives.

Further details and advantages of the invention arise out of the description of the embodiments, illustrated in the

DETAILED DESCRIPTION OF THE PREFERRED EMBODIMENTS

Figure 1:
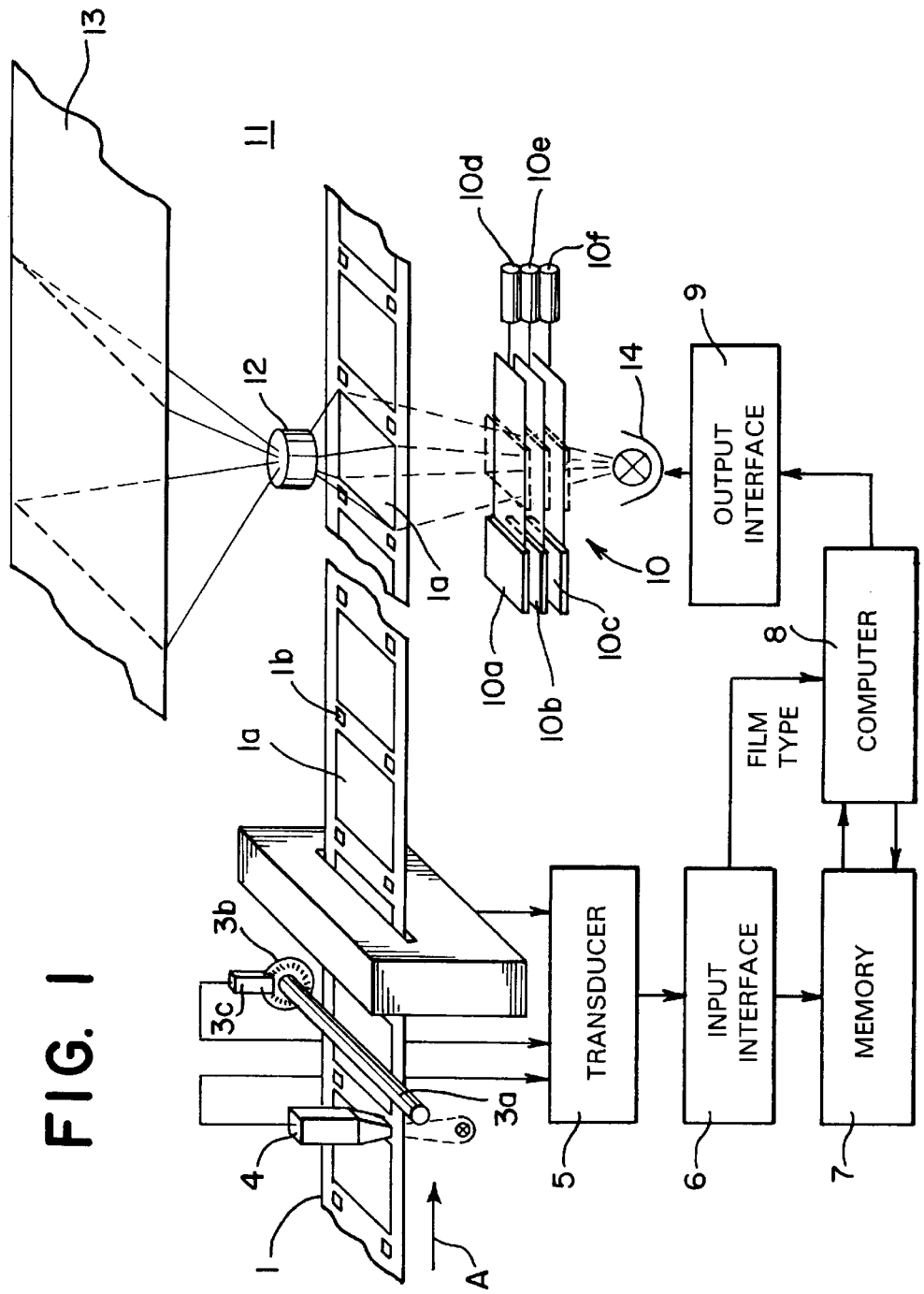
FIG. 1 is a diagrammatic view, illustrating a copier, for employing the method of the present invention.

Referring to FIG. 1, the reference numeral 1 identifies a length of photosensitive material or film having a series of originals or negatives 1a. The film 1 further has a series of detectable marks 1b which are correlated with and identify the positions of the negatives 1a. The marks 1b may, for example, be apertures which are aligned with the negatives 1a as is the case for 126 and 110 size film. The marks may also be in the form of notches which are disposed at the edges of the film 1. For 135 size film, such notches 1c are formed at the edges in correlation with the negatives 1a after the film has been exposed and developed. The film 1 is here assumed to be an exposed and developed film.

The direction of travel of the film 1 is indicated by the arrow A. A sensing device 4, e.g. in the form of a light barrier, is located along the path A of the film 1 and detects the marks 1b as they pass by. The sensing device 4 emits a signal upon detection of a mark 1b and such signal is forwarded to a transducer 5. The sensing device 4 also functions to read a bar code on the edge of the film 1.

A length detector 3 is disposed adjacent to the path A of the film 1 downstream of the sensing device 4. The length detector 3 includes a roller 3a which is caused to rotate by the film 1. A disc 3b is mounted on the roller 3a and is provided with a series of uniformly spaced, radial slits near its periphery. The disc 3b is arranged to rotate through a light barrier 3c which generates pulses in response to detection of the slits. The pulses are indicative of the length of film traveling by the length detector 3.

Downstream of the length detector 3 as considered in the direction of travel A of the film 1 is a transparency or light measuring system 2. The transparency measuring system 2 has three rows of photoreceivers, e.g. phototransistors or photodiodes, which extend across the width of the film 1. Each row may contain ten photoreceivers which respectively scan one-tenth of the width of the film 1. Each photoreceiver is sensitized for one of the primary colors and the photoreceivers are arranged in such a manner that any region or point of the film 1 subjected to a measurement is scanned in each of the three primary colors. The photoreceivers are designed to emit signals representative of the transparency of the film 1 in the respective colors. In order to ensure that each point or region of the film 1 which is subjected to a measurement is scanned in each of the three primary colors, the three rows of photoreceivers may be located closely behind one another as considered in the direction of travel A of the film 1. It is also possible for the three rows of photoreceivers to be remote from one another and to direct the light which has passed through a region of the film 1 to be measured to the respective rows of photoreceivers via filters and/or partially light-transmissive reflectors.

The transparency measuring system 2 is connected with the transducer 5 so that the three transparency signals, i.e. one signal per color, for each measured region of the film 1 are delivered to the transducer 5. The transducer 5 converts the transparency signals into density values. The length detector 3 coordinates the movement of the film 1 and the operation of the measuring system 2 in such a manner that an original 1a of specific size is scanned in its entirety by the performance of a specific number of measuring procedures. For instance, the length detector 3 may coordinate movement of the film 1 and operation of the measuring system 2 so that an original 1a of small size is entirely scanned by the performance of fourteen measuring procedures. During each measuring procedure, 30 signals are generated by the measuring system 2, namely, ten in each color. The sensing device 4 functions to correlate the measurements made by the measuring system 2 with the originals 1a on which the measurements were performed.

An input interface 6 is connected with and arranged to receive the density values calculated by the transducer 5. The input interface 6 transmits these density values to a computer 8 as well as to a memory 7. The computer 8 and memory 7 are connected with one another. The computer 8 retrieves from the memory 7 those data required for the individual steps of the calculation to be described below. By way of example, the computer 8 may be a microprocessor marketed by Digital Equipment Corp. under the designation LSI 11/23.

An output interface 9 is connected with the computer 8. The output interface 9 delivers control pulses to a filter system 10 constituting part of a copying station 11. The copying station 11 is located a certain distance downstream of the measuring system 2. In addition to the filter system 10, the copying station 11 contains a light source 14 and an objective lens 12. The objective lens 12 focuses the image of an original 1a located in the copying station 11 onto a strip 13 of the color copying material.

The filter system 10, which is located between the light source 14 and film 1, comprises three copying filters 10a, 10b, 10c as well as guides and drives for the filters 10a–10c. The drives are conventional and are here in the form of electromagnets 10d, 10e, 10f, which respectively move the filters 10a–10c. Each of the filters 10a–10c is designed to terminate exposure of an original 1a in one of the primary colors upon being moved into the path of the light from the light source 14 to the original 1a. The illustrated filter system 10 containing the color filters 10a–10c and the corresponding electromagnets 10d–10f is designed to regulate the amounts of copying light in the different colors by controlling the exposure time in each color. However, the amounts of copying light in the various colors may also be regulated by controlling the intensity of the light. This may be accomplished by moving subtractive color filters into the path of the copying light to a greater or lesser extent so that the required color composition calculated by the computer 8 is achieved. The exposure time is here the same for all of the primary colors and is calculated by the computer 8. The exposure may be terminated using a shutter which is equipped with a drive similar to that employed for the filters 10a–10c.

In a first calibration step, a test film 1 is sent through the transparency measuring system 2. On this test film, gray tones with at least three and better yet five gray fields are exposed. The middle field is always exposed in the average density range and the two extreme values are 10% above haze and 10% below saturation. On passage through the scanner, the values measured for the gray surfaces of the test film are read into the memory 7. It is important that the same measurement filters be used for the evaluation of the test films and of the film that is to be copied later on. These measurement filters are determined by the sensitivity of the copying material used. In addition, using the same scanner filters ensures that light deviations have the same effect on the calibration with the test film and the measurement of the film to be copied and therefore do not result in any wrong measurements of the color originals.

Additionally, the bar code on the edge of the film, containing coded information concerning the film type, is read by the sensing device 4 and is entered into the memory 7. With that, the memory 7 contains, under an address linked to this bar code, data concerning a pair of color density difference curves, which corresponds to the characteristics of an average film of this type. If the standard color density difference curves are calculated by forming average value, computer 8 evaluates and stores the measured values.

The curves are constructed by plotting individual points, obtained from various measured regions. For example, in the blue minus green curve of FIG. 2a, the green density value is subtracted from the blue density value. This value is entered into a system of coordinates on the B-G axis, against the average arithmetic density for the red, green, and blue values in that region. Points are plotted on the system of coordinates for the various regions. The data from each region is not always suitable for use in the color density difference curves. In certain cases, the data from a region should be ignored in constructing the color density difference curves, as contemplated by the various embodiments of this invention.

After a suitable number of points are plotted, a functional relationship for the color density difference curves is approximated by the computer, for example by polynomial approximation. Each of the curves (as identified in FIGS. 2a and 2b ) is referred to herein as a "standard color density difference curve". The "functional relationship" refers to the equation which defines the curve.

Slightly diverging zone boundaries, which are approximately parallel to the color density difference curves and characterize the zone in which non-dominant measurement value pairs lie, are shown above and below the color density difference curves in FIGS. 2a and 2b. If a measurement value difference, such as blue minus green or red minus green, when plotted as a function of the average density, falls outside of this zone above and below the standard color density difference curve, this point is recognized as dominant and should not be used to form the film-specific color density difference curve. Comparison with the standard color density difference curves is useful for spotting such anomalous points.

Figure 2A:
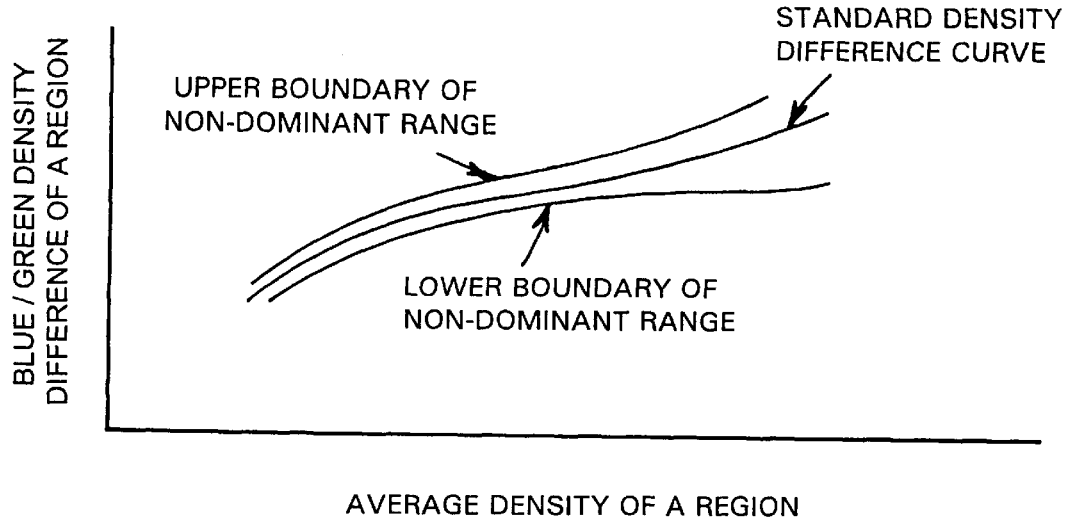
FIGS. 2a and 2b shows standard color density difference curves of blue-green and red-green of a conventional film type with the associated boundary lines for the non-dominant regions.
Figure 2B:
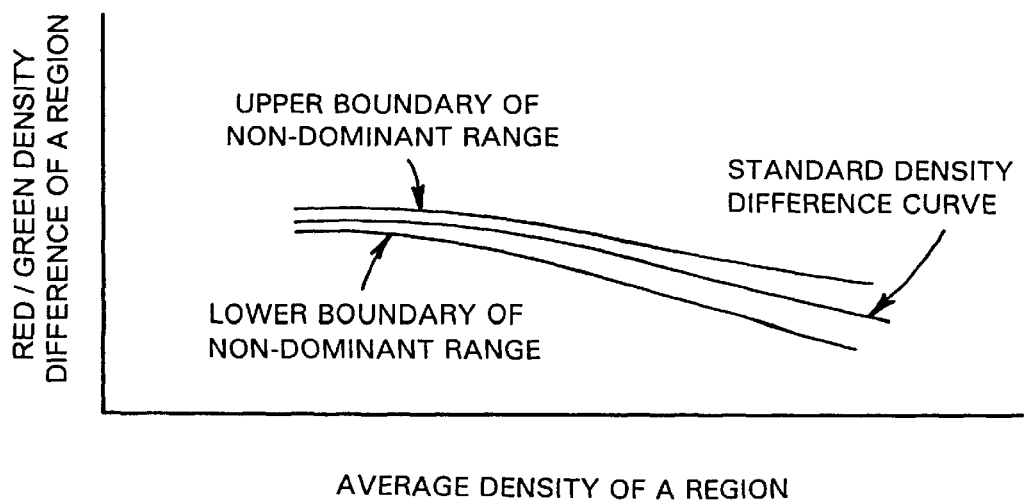

These standard curves of FIGS. 2a and 2b can be used in the same way for identifying photographs with atypical illumination. According to the teachings of U. S. Pat. No. 4,566,786, the color density difference curves may be used to spot photographs which were essentially made in incandescent light. Such atypical photographs should be excluded in the formation of film-specific color density difference curves.

From the measured value pairs that are not recognized as not dominant, the color density difference curves are formed in accordance with the teachings of U. S. Pat. No. 4,279,502 Such curves are referred to herein as "film-specific color density difference curves". These values in combination with the color original-specific values are used to specify the copying light illumination needed to copy the particular original. As used herein, "color original " (or "original") refers to the film image which is to be copied. "Color original-specific values" refers to the color density difference curves for (i.e. specific to ) the color original.

These standard color density difference curves offer the further advantage that they can be used as partial information for film-specific values for the calculation of copying light amounts. This is particularly advantageous when, in rows of color originals, especially whole films, certain types of color originals predominate, showing a strong tendency toward a particular color. This is the case particularly for portrait films, which have been photographed in the studio under the same conditions of exposure. In the case of such studio portrait films, the effective standard color density difference curves obtained by combining; the standard color density difference curves of the film type with the film-specific color density difference curves of the respective films are a good compromise between the respective advantages and disadvantages. As used herein, the term "effective standard color density difference curve" which has been modified (for example, by averaging) by at least one other film-specific or original-specific color density difference curve for use as a new or "effective " standard. In particular, for very short films or even individual negatives, the standard color density difference curves offer the only possibility for avoiding the randomness of the respective motif choice and the greater or lesser small number of non-dominant points within such a color original, and of obtaining well-founded information concerning the film-specific values. In such a case, the standard color density difference curves should be mixed with the film color density difference curves at a very high proportion. The film-specific color density difference curves may exclusively consist of the standard color density difference curves for that film type.

What is claimed is:

1. In a photographic copying process in which colored originals on different types of film appear at a copying station to be copied, a method for determining the amount of light in each primary color for copying such colored originals, the color image of each original being scanned to determine the density of the primary colors by region or by point and the results of such density determination being used to control the amounts of the copying light, wherein for each scanned region a first difference is formed between the density values of two primary colors and a second difference is formed between the density values of one of these primary colors and the third Primary color and the average density is formed from the density measurements of the three primary colors, such that for each film to be copied a color density difference curve relative to average density is produced, which curve describes the color behavior of the film which contains the original to be copied and supplies film-specific values for producing copies of the film, said film-specific values being used for the determination of the copying light illumination for the colored original to be copied, the improvement comprising forming color density difference curves relative to average density for films of a specific type, storing said last named color density difference curves. and, when a film of said specific type appears at the copying station containing a colored original to be copied, using these stored color density difference curves to determine the amount of light in each primary color for copying said colored original, wherein said last named color density difference curves are determined by exposing gray fields on test films, measuring the developed test films with measurement filters used in the copying equipment, and storing color density difference curves obtained therefrom for use when a film of the same type appears.

2. The method of claim 1, wherein said last named color density difference curves are formed first with data measurements from test films, and then by averaging the data measurements from test films with subsequent data measurements taken during the copying operation from films of the same film type.

3. In a photographic copying process in which colored originals on different types of film appear at a copying station to be copied, a method for determining the amount of light in each primary color for copying such colored originals, the color image of each original being scanned to determine the density of the primary colors by region or by point and the results of such density determination being used to control the amounts of the copying light, wherein for each scanned region a first difference is formed between the density values of two primary colors and a second difference is formed between the density values of one of these primary colors and the third primary color and the average density is formed from the density measurements of the three primary colors, such that for each film to be copied a color density difference curve relative to average density is produced, which curve describes the color behavior of the film which contains the original to be copied and supplies film-specific values for producing copies of the film, said film-specific values being used for the determination of the copying light illumination for the colored original to be copied, the improvement comprising forming color density difference curves relative to average density for films of a specific type, storing said last named color density difference curves, and, when a film of said specific type appears at the copying station containing a colored original to be copied, using these stored color density difference curves to determine the amount of light in each primary color for copying said colored original, wherein said last named color density difference curves are calculated as the average of a larger number of color density difference curves of the same film type in question, each obtained during the copying operation.

* * * * *